(12) United States Patent
Savary et al.

(10) Patent No.: US 11,431,375 B2
(45) Date of Patent: Aug. 30, 2022

(54) LEAKAGE CANCELLATION IN A RADAR RECEIVER

(71) Applicant: NXP USA, INC., Austin, TX (US)

(72) Inventors: Pierre Pascal Savary, Muret (FR); Stephane Damien Thuries, Saubens (FR); Didier Salle, Toulouse (FR)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/690,419

(22) Filed: Nov. 21, 2019

(65) Prior Publication Data

US 2020/0186186 A1 Jun. 11, 2020

(30) Foreign Application Priority Data

Dec. 11, 2018 (EP) ..................................... 18306669

(51) Int. Cl.
| | | |
|---|---|---|
| *H04B 1/525* | (2015.01) | |
| *H04B 1/30* | (2006.01) | |
| *H04B 1/403* | (2015.01) | |

(52) U.S. Cl.
CPC ............... *H04B 1/525* (2013.01); *H04B 1/30* (2013.01); *H04B 1/406* (2013.01)

(58) Field of Classification Search
CPC .......... H04B 1/525; H04B 1/30; H04B 1/406; G01S 7/4017; G01S 7/4021; G01S 7/038; G01S 7/023; G01S 7/42
USPC ....................................................... 455/63.1
See application file for complete search history.

(56) References Cited

U.S. PATENT DOCUMENTS

| | | | |
|---|---|---|---|
| 7,202,812 B2 | 4/2007 | Krikorian et al. | |
| 8,866,667 B2 | 10/2014 | Vacanti et al. | |
| 8,917,204 B2 | 12/2014 | Trotta et al. | |
| 10,018,716 B2 | 7/2018 | Ferguson et al. | |
| 2005/0116782 A1* | 6/2005 | Smith ..................... | H03L 7/093 331/17 |
| 2009/0243736 A1* | 10/2009 | Miura .................... | H03L 7/113 331/1 R |
| 2011/0105105 A1 | 8/2011 | Reuter | |
| 2012/0112956 A1 | 5/2012 | Trotta et al. | |
| 2014/0273828 A1* | 9/2014 | Yang ...................... | H03D 3/009 455/41.1 |
| 2015/0009064 A1* | 1/2015 | Waldschmidt ........ | G01S 7/4021 342/175 |
| 2017/0168140 A1 | 6/2017 | Hosokawa et al. | |

FOREIGN PATENT DOCUMENTS

| | | |
|---|---|---|
| EP | 0138253 A2 | 8/1991 |
| JP | 2009288832 A | 12/2009 |

* cited by examiner

*Primary Examiner* — Eugene Yun

(57) ABSTRACT

A transceiver includes a transmitter, a frequency synthesizer coupled to the transmitter, a receiver coupled to the frequency synthesizer and a voltage sensor; and a digital controller coupled to the voltage sensor, the receiver, and the transmitter, wherein based on a DC voltage measurement of an IF signal made by the voltage sensor, a relative phase adjustment occurs of a relative phase associated with a local oscillator (LO) port and a radio frequency (RF) port of the receiver.

20 Claims, 3 Drawing Sheets

LEAKAGE CANCELLATION IN A RADAR RECEIVER

CROSS-REFERENCE TO RELATED APPLICATIONS

This application claims the priority under 35 U.S.C. § 119 of European Patent application no. 18306669.5, filed on 11 Dec. 2018, the contents of which are incorporated by reference herein.

BACKGROUND

Automotive Radio and Detection Ranging, often referred to as 'Automotive Radar', systems are increasingly used in many vehicle applications, such as, for example, adaptive cruise control, autonomous driving, and other sensor-based applications. Issues that can affect driver safety such as radar malfunction due to signal degradation are of critical importance to vehicle manufacturers. For example, automotive radar systems are integrated in vehicular environments that can cause signal leakages or parasitic couplings between the transmit and the receive ports of the radar transceiver. The signal leakages can cause the automotive radar system to malfunction by degrading the detection level of the automotive radar to a point where some target devices are unable to be detected by the automotive radar, impacting driver safety.

Conventional techniques exist that attempt to cancel the effects of parasitic coupling and signal leakages in automotive radar systems include, for example, adding a delay on the local oscillator (LO) signal to the mixer of the receiver or adding a complementary signal at the radio frequency (RF) input of the mixer. However, these leakage cancellation techniques may not reduce the parasitic coupling and signal leakages enough to significantly improve the detection rate of the automotive radar. Thus, a need exists for an improved leak cancellation technique in automotive radar systems that improves the detection rate of the automotive radar.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
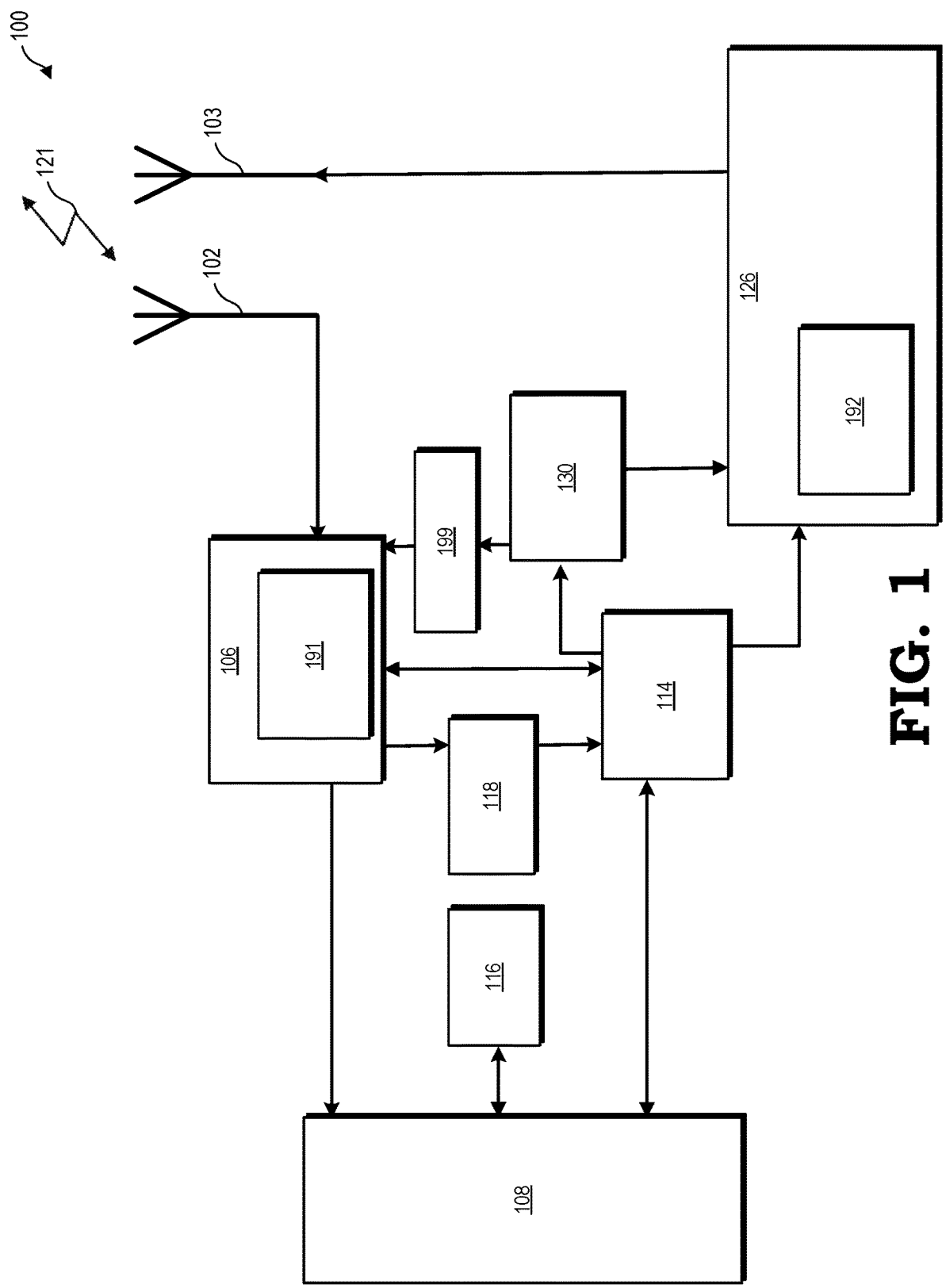
FIG. 1 illustrates a block diagram of an automotive radar system in accordance with some embodiments.
Figure 2:
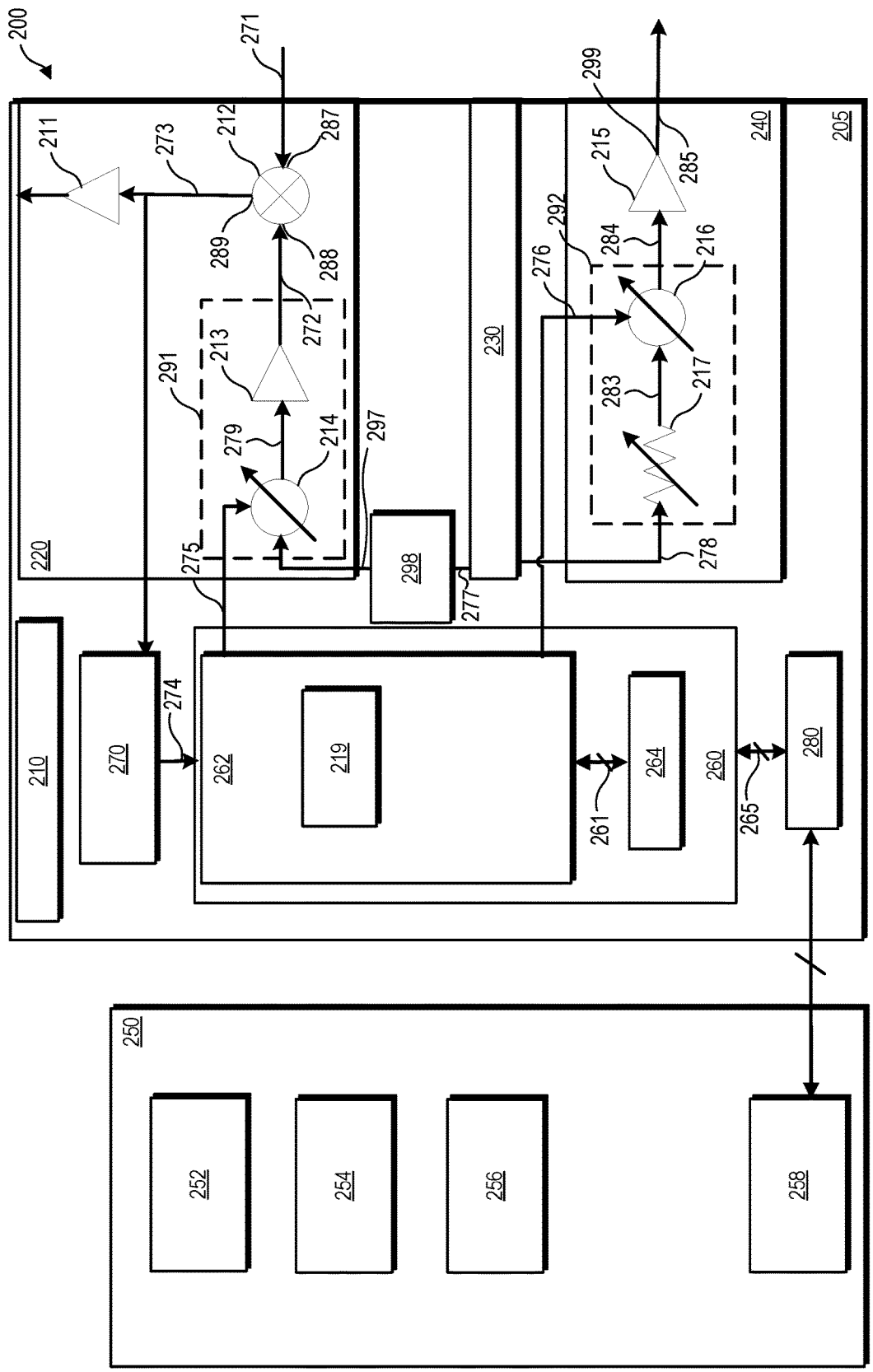
FIG. 2 illustrates a block diagram of an automotive radar device with leakage cancellation, in accordance with some embodiments.
Figure 3:
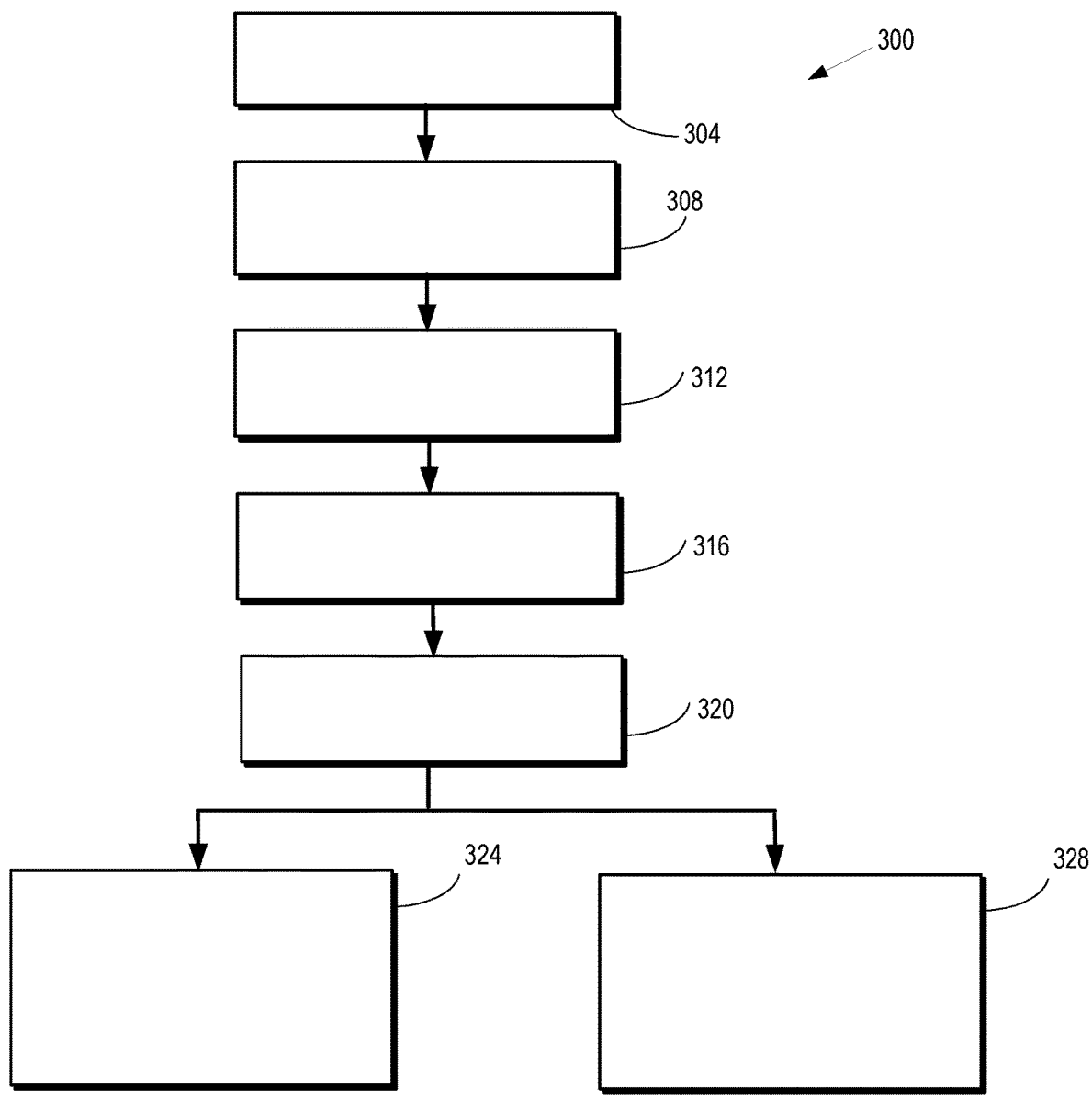
FIG. 3 illustrates a simplified flowchart of a method of performing leakage cancellation in an automotive radar system.

With reference to FIGS. 1-3, a leakage cancellation technique is implemented that reduces the uncorrelated phase noise or DC offset in a radar device. In various embodiments, in the case of noise reduction in the intermediate frequency (IF) signals due to the uncorrelated phase noise, the radar device uses the relative phase between a local oscillator (LO) port and a radio frequency (RF) port of an RF mixer of the receiver to reduce the uncorrelated phase noise. In various embodiments, in order to reject the uncorrelated phase noise, the relative phase is adjusted to be at a specific angle, e.g., 0 degrees, that corresponds to maximum uncorrelated phase noise rejection in the radar device. The relative phase is swept using a phase shifter on the LO path and/or a phase shifter on the transmit path of the transceiver. The DC voltage of the IF signal is measured periodically versus the relative phase in order to detect the maximum voltage. The maximum voltage gives the maximum uncorrelated phase noise rejection due to signal leakage. The relative phase corresponding to the maximum voltage is kept constant to maximize the noise reduction capabilities of the radar device, while adjusting the phase associated with the transmitter circuitry (i.e., the transmit phase shifter) by changing the phase associated with the LO of the receiver circuitry (i.e., the LO phase shifter).

In various embodiments, the leakage cancellation technique may also be used to cancel the DC offset in the radar device. In various embodiments, in order to reject the DC offset, the relative phase is adjusted to be at or about 90 degrees, which corresponds to the maximum DC offset rejection in the radar device. Similarly, the relative phase is swept using a phase shifter on the LO path and a phase shifter on the transmit path of the transceiver with the DC voltage of the IF signal is measured periodically versus the relative phase in order to detect the minimum voltage. The minimum voltage gives the maximum DC offset cancellation due to signal leakage. The relative phase corresponding to the minimum voltage is kept constant to maximize the DC offset cancellation capabilities of the radar device while similarly adjusting the phase associated with the transmitter circuitry (i.e., the transmit phase shifter) by changing the phase associated with the LO of the receiver circuitry (i.e., the LO phase shifter).

FIG. 1 is an illustration of a block diagram of a radar device 100 operating at millimeter (MMW) frequencies in accordance with various embodiments. The radar device 100 includes one or several antennas 102 for receiving radar signals 121, and one or several antennas 103 for transmitting radar signals 121, with one respective antenna shown for each for simplicity reasons only. The number of antennas 102 and antennas 103 used depend on the number of radar receiver and transmitter channels that are implemented in a given radar device.

With reference to the receiver portion of radar device 100, one or more receiver chains include receiver circuitry 106, effectively providing reception, frequency conversion, filtering and intermediate or base-band amplification, and finally an analog-to-digital conversion of the received signal. In some examples, a number of such circuits or components may reside in signal processing module 108, dependent upon the specific selected architecture. Receiver circuitry 106 is coupled to the signal processing module 108 (generally realized by a digital signal processor (DSP)), voltage sensor 118, controller 114, delay circuitry 198, and frequency generation circuit 130. A skilled artisan will appreciate that the level of integration of receiver circuits or components may be, in some instances, implementation-dependent.

With reference to the transmitter portion of radar device 100, one or more transmit chains include transmit circuitry 126, effectively providing signal transmission for radar device 100 and includes transmitter phase shift circuitry 192 and a power amplifier (PA) (not shown) coupled to the transmitter's one or several antennas 103, antenna array, or plurality of antennas. In radar device 100, radar transceiver topology is different from traditional wireless communication architectures (e.g. Bluetooth™ WiFi™ etc.), as modulation occurs within a phase locked loop (PLL) (typically via a fractional-N divider), and is applied directly to the PA. Therefore, in some examples, the receiver circuitry 106 and transmitter circuitry 126 are coupled to frequency generation circuit 130 arranged to provide local oscillator signals. The generated local oscillator signals are thus modulated directly to generate transmit radar signals, and also used to down-convert received modulated radar signals to a final intermediate or baseband frequency or digital signal for processing in a receive operation.

In FIG. 1, a single signal processor may be used for signal processing module 108 or a single microcontroller unit (MCU) may be used for digital controller 114 to implement the processing of received radar signals. In various embodiments, at least one transceiver of the radar device 100, for example including at least one transceiver, is configured to support frequency modulated continuous wave (FMCW). Clearly, the various components within the radar device 100 can be realized in discrete or integrated component form, with an ultimate structure therefore being an application-specific or design selection. A skilled artisan will appreciate that the level of integration of circuits or components may be, in some instances, implementation-dependent.

Digital controller 114, for example, in a form of a microcontroller unit (MCU), in addition to maintaining overall operational control of the radar device 100, performs noise reduction or DC offset reduction functions of radar device 100. In order to perform noise reduction or DC offset reduction, digital controller 114 is configured to operate in a calibration mode and an operation or functional mode. During calibration mode, digital controller 114 calibrates radar device 100 by utilizing IF DC voltage measurements (and corresponding relative phases associated with the RF port and LO port of receiver circuitry 106) of an IF signal that are provided by voltage sensor 118 (discussed in further detail with reference to FIG. 2 below). In various embodiments, the relative phase is swept within, for example, a 180 degree range by changing either the transmit phase shifters phase setting in transmitter phase shift circuitry 192 or the LO phase shifter phase setting in LO phase shift circuitry 191 and recording the IF DC voltage with voltage sensor 118. Utilization of the IF DC voltage measurements and corresponding relative phases allows digital controller 114 to provide phase adjustment settings to LO phase shift circuitry 191 and transmitter phase shift circuitry 192 that allowS both uncorrelated phase noise or DC offset to be reduced. In various embodiments, during the functional mode of operation, the phase settings of the phase shifters in LO phase shift circuitry 191 and transmitter phase shift circuitry 192 are kept constant relative to each other, which means that the relative phase of the RF mixer in receiver circuitry 106 remains constant. Thus, when the phase setting of transmitter phase shifter in transmitter phase shift circuitry 192 is changed by digital controller 114, the phase setting of the LO phase shifter of LO phase shift circuitry 191 is also modified accordingly, in order to keep the relative phase constant. In some examples, digital controller 114 may comprise time-based digital functions (not shown) to control the timing of operations (e.g. transmission or reception of time-dependent signals, FMCW modulation generation, etc.) within the radar device 100. Digital controller 114 is coupled to receiver circuitry 106, voltage sensor 118, signal processing module 108, frequency generation circuit 130, and transmitter circuitry 126. In some examples, digital controller 114 is also coupled to a memory device 116 that selectively stores operating regimes, such as decoding/encoding functions, and the like.

With reference to receiver circuitry 106 and transmitter circuitry 126, the voltage sensor 118 is coupled to receiver circuitry 106 to measure the DC voltage or DC voltages of the intermediate frequency (IF) signal output by an RF mixer in receiver circuitry 106. Digital controller 114 is configured to utilize the DC voltage measurements made by voltage sensor 118 to provide phase setting information to receiver circuitry 106 and transmitter circuitry 126 in order to enable noise reduction or DC offset reduction techniques provided by radar device 100, as described with reference to, inter alia, FIG. 2.

FIG. 2 illustrates a block diagram of a radar device 200 in accordance with various embodiments. Radar device 200 includes a transceiver 205 and microcontroller unit 250. Radar transceiver 205 includes one or more receivers 220, frequency synthesizers 230, transmitters 240, voltage sensors 270, serial peripheral interfaces (SPIs) 280, delay circuits 298, and power management units 210, which may be in a form of a power management integrated circuit (IC). Radar transceiver 205 also includes a digital part, which may be in a form of a digital IC 260, which includes a digital controller 262, such as MCU 114 from FIG. 1 operably coupled via bus 261 to a storage unit 264, such as registers and/or memory. Digital controller 262 includes a control circuit 219 that provides phase settings to receiver 220 and transmitter 240 to provide noise reduction or DC offset reduction. The power management unit 210 generates reference currents and voltages that are needed within radar device 200.

In various embodiments, for the purposes of example implementations, the high frequency transceiver 205 is described in terms of a homodyne radar transceiver architecture, although the functional elements are recognized as being similar or equivalent to those found in most wireless transceivers. In the subsequent description, the term transceiver encompasses both the unit that performs transmitter and receiver operations (such as a homodyne radar unit or a high frequency communication unit), as well as a discrete-component transceiver circuit or transceiver chipset that is designed to perform the specific high frequency transceiver operations within such a radar or high frequency communication unit.

Frequency synthesizer 230 includes all the functions related to the generation of the reference frequencies for leakage cancellation and noise reduction operations. Frequency synthesizer 230 may comprise at least one oscillator, frequency doublers, a phase comparator or a loop filter or any other phase locked loop (PLL) arrangement. Frequency synthesizer 230 generates, for example, a constant frequency or a range of frequencies from a single reference frequency that are provided to receiver 220 and transmitter 240.

In various embodiments, for the example illustrated in FIG. 2, frequency synthesizer 230 provides a frequency synthesizer signal 277 and a frequency synthesizer signal 278 to the LO path 291 of receiver 220 and the transmit path 292 of transmitter 240, respectively, that are of a constant frequency during the calibration mode operation of transceiver 205. During normal operation mode, however, the frequency of frequency synthesizer signal 277 and frequency synthesizer signal 278 are FMCW modulated. Frequency synthesizer signal 277 is fed to delay circuit 298 to provide a delayed frequency synthesizer signal 297 to phase shifter 214. In various embodiments, delay circuit 298 is used in, for example, the case of FMCW operation, to compensate for the delay of the leakage signal going back from transmitter 240 to receiver 220. Delay circuit 298 allows LO path output signal 272 and the leakage in RF signal 271 to arrive simultaneously. In various embodiments, delay circuit 298 is configured to delay frequency synthesizer signal 277 to align LO path output signal 272 with RF signal 271. That is, delay circuit 298 is configured the align the frequency of LO path output signal 272 with the frequency of RF signal 271. For example, without the added delay provided by delay circuit 298, the frequencies of LO path output signal 272 and RF signal 271 would be different due to leakage from transmit port 299 RF port 287. Frequency synthesizer signal 278 is fed to phase shifter 216. Phase shifter 214 and phase shifter 216 shift the phases of delayed frequency synthesizer signal 297 and frequency synthesizer signal 278 over a number of degrees indicated by phase shifting signal 275 and phase shifting signal 276. The amount of shift is dictated by IF DC voltage measurements made by voltage sensor 270 and the associated relative phases. Under control of phase shifting signal 275 and phase shifting signal 276 provided by control circuit 219 of digital controller 262, the phases of delayed frequency synthesizer signal 297 and frequency synthesizer signal 278 are shifted (or rotated). For example, the phase shift may be 180 degrees, although other phase shifts, such as 90 degrees are possible.

Transmitter 240 includes a transmit path 292 and a power amplifier 215. In addition to containing the functionality related to transmission of the emitted signal, such as power amplification using power amplifier 215, transmitter 240 also provides phase shifting capabilities in transmit path 292. Transmit path 292 includes a gain controller 217 that adjusts the gain of received frequency synthesizer signal 278 from frequency synthesizer 230 and a phase shifter 216 that shifts the phase of gain adjusted frequency synthesizer signal 283 based on a phase adjustment signal 276 provided from control circuit 219 of digital controller 262.

Receiver 220 includes an LO path 291, an intermediate frequency amplifier (IFA) 211, and an RF mixer 212. RF mixer 212 includes an RF port 287 for receiving an RF signal 271, an LO port 288, an LO path output signal 272, and an IF port 289 for outputting an intermediate frequency (IF) signal 273. In addition to containing the functionality related to the reception and conversion of the reflected received radar signal, receiver 220 also includes phase shifting capabilities provided by LO path 291. LO path 291 is coupled to control circuit 219 of digital controller 262 and RF mixer 212 and includes a phase shifter 214 coupled to a low-noise amplifier 213, to provide a LO path output signal 272 to RF mixer 212 for noise reduction or DC offset reduction capabilities. Phase shifter 214 and phase shifter 216 are multi-phase (also called multi-bit) phase shifters with, for example, sixteen, thirty-two, or more phase steps and are used in LO path 291 and transmit path 292, respectively.

Voltage sensor 270 is coupled to receiver 220 and is configured to measure DC voltages of IF signal 273 provided at the IF output port of RF mixer 212. In one embodiment, voltage sensor 270 provides the measured DC voltage values to digital controller 262 via a bus 274. In various embodiments, the recorded DC voltage values are stored in the registers of the storage unit 264 and provided to control circuit 219. The DC voltage values can also be read by the user via SPI 280 and SPI 258 associated with the MCU 250, via bus 265.

MCU 250 includes a processing unit 252, a storage unit 254, a digital controller 256 and SPI 258 in order to communicate with the radar transceiver 205. The processing unit 252 is responsible for the digital signal processing of the data received from the radar transceiver 200, this data being, say, representative of a radar target speed, distance or speed variation. The storage unit 254 is the general memory of the MCU 250 that is responsible for both dynamic data storage (random access memory (RAM) and/or flash memory) as well as read only memory (ROM) (static) data storage.

Digital controller 262 manages the communication between all MCU different blocks and units, together with sequencing all the process (state machine) for the correct operation of the MCU 250. In addition, digital controller 262 performs noise reduction or DC offset reduction functions of radar device 100. As stated previously, in order to perform noise reduction or DC offset reduction, digital controller 262 utilizes IF DC voltage measurements of an IF signal and corresponding relative phases associated with RF port 287 and LO port 288 of receiver 220 that are provided by voltage sensor 270. Utilization of the IF DC voltage measurements and corresponding relative phases allows digital controller 262 to provide phase adjustment settings to phase shifter 214 and phase shifter 216 that allow both uncorrelated phase noise or DC offset to be reduced.

During operation of radar device 200, RF mixer 212 of receiver 220 receives an RF signal 271 and a LO path output signal 272 from power amplifier 213. The difference between the phase of RF signal 271 and the phase of LO path output signal 272 is the relative phase of RF signal 271 and LO path output signal 272. In various embodiments, radar device 200 is configured to find the optimum relative phase of RF signal 271 and LO path output signal 272 and maintain the optimum relative phase by programming phase shifter 214 and phase shifter 216 of LO path 291 and transmit path 292, respectively (discussed further below).

After receiving RF signal 271, RF mixer 212 demodulates RF signal 271 using LO path signal 272 and reduces the incoming RF signal 271 to an intermediate frequency (IF) signal 273. RF mixer 212 provides IF signal 273 to IFA 211 and voltage sensor 270. IFA 211 amplifies IF signal 273 and provides the amplified output IF signal 273 to signal processing module of radar device 100 for further signal processing. Voltage sensor 270 receives IF signal 273 and takes voltage measurements of the DC voltage of IF signal 273. In various embodiments, the DC voltage of IF signal 273 is measured periodically at the phase difference steps of the received IF signal 273. Each measured DC voltage maps to a relative phase associated with IF signal 273. That is, for the DC voltage versus the relative phase difference (the phase between LO path output signal 272 and RF signal 271), the DC voltage is maximum for a relative phase of 0 degrees and 180 degrees. The DC voltage is minimum for a relative phase of 90 degrees and 270 degrees.

Voltage sensor 270 provides the measured IF DC voltages and the corresponding relative phases to digital controller 262. Digital controller 262 receives the measured IF DC voltages and the corresponding relative phases and utilizes the measured values to ascertain a maximum DC voltage and a corresponding maximum voltage relative phase and a minimum DC voltage and a corresponding minimum voltage relative phase. That is, control circuit 219 of digital controller 262, stores and records the measured IF DC voltages using, for example, storage unit 264 and searches the IF DC voltages to determine the maximum IF DC voltages of the measured voltages and the corresponding maximum voltage relative phases. Similarly, control circuit 219 searches the measured IF DC voltages to determine the minimum IF DC voltage of the measured voltages and the corresponding minimum voltage relative phase. The maximum IF DC voltage corresponds to the maximum uncorrelated phase noise rejection of RF mixer 212. The minimum IF DC voltage corresponds to the maximum DC offset cancellation of RF mixer 212. Control circuit 219 then generates a phase shifting signal 275 and a phase shifting signal 276 using the measured IF DC voltages and the corresponding relative phases to provide to LO path 291 of receiver 220 and transmit path 292 of transmitter 205, respectively.

Phase shifter 214 of LO path 291 receives phase shifting signal 275 from control circuit 219 and a delayed frequency synthesizer signal 297 from frequency synthesizer 230 and adjusts the phase of delayed frequency synthesizer signal 297 by the amount specified by phase shifting signal 275 to generate phase shifted output signal 279. Phase shifter 214 provides phase shifted output signal 279 to amplifier 213, which amplifies phase shifted output signal 279 to yield LO path output signal 272. LO path output signal 272 is provided to RF mixer 212 to adjust RF input signal 271 using the optimum relative phase. In one embodiment, the optimum relative phase corresponds to the maximum DC IF voltage, which gives the maximum uncorrelated phase noise rejection in radar device 200 due to signal leakage. That is, keeping the DC IF voltage at a maximum value using the calibration associated with phase shifter 214 in LO path 291 keeps the noise figure at a minimum. In another embodiment, the optimum relative phase corresponds to the minimum DC IF voltage, which gives the maximum DC offset cancellation in radar device 200. That is, keeping the DC IF voltage at a minimum value using the calibration associated with phase shifter 214 in LO path 291 maximizes the DC offset cancellation of radar device 200.

Similarly, phase shifter 216 of transmit path 292 receives a gain adjusted frequency synthesizer signal 283 from gain controller 217 and phase shifting signal 276 from control circuit 219 and adjusts the phase of gain adjusted frequency synthesizer signal 283 by the amount specified by phase shifting signal 276. Phase shifter 216 provides phase shifted output signal 284 to power amplifier 215. Power amplifier 215 receives phase shifted output signal 284 and amplifies phase shifted output signal 284 to yield transmitter output signal 285. Transmitter output signal 285 is provided to an antenna/s (not shown) at a power level suitable for radar transmission.

In various embodiments, radar device 200 may be modified to accommodate transceivers 205 with more than one receive channel in receiver 220. In one embodiment, a single phase shifter 214 in LO path 291 may be used for the entire set of receive channels. In another embodiment, a phase shifter 214 may be used for each receive channel, i.e., a phase shifter 214 in each LO path 291 of each receive channel. Using, for example, a single phase shifter 214 for multiple receive channels has the advantage of simplicity, small chip area and low power consumption. Using a separate phase shifter 214 on each LO path 291 has the advantage of increased robustness to adjust for possible different relative phases between LO signal and leakage-induced RF signal in each RF mixer 212.

In various embodiments, radar device 200 is configured to support multiple-input multiple-out (MIMO) radar operations with multiple receivers 220 and transmitters 240 in transceiver 205. In various embodiments, the calibration procedure described above is executed for each receiver 220 and transmitter 240. The resulting optimum phase setting per LO path 291 is stored in a calibration look-up table (LUT) in, for example, storage unit 264. The LUT contains at least one line per transmit channel and one row per receive channel, and possibly more dimensions depending on the number of transmit paths and receive paths in the MIMO radar device.

In various embodiments, when the LUT is filled with the appropriate DC IF voltage and relative phase values after each calibration, control circuit 219 applies the corresponding value of phase control (i.e., LO phase shifting signal 275 and transmit phase shifting signal 276) from the LUT to each phase shifter 214 of each receive channel and each phase shifter 216 of each transmit channel. In various embodiments, when a single transmit channel is enabled at a given time (e.g., Time-division MIMO), then the LUT value used by the transmit channel corresponds to the LUT value used for the corresponding receive channel. In various embodiments, when a different phase shift is generated in the transmit phase shifter 216 of the enabled transmit channel compared to the transmit phase shift used during calibration, the corresponding transmit phase shift is taken into account in all the phase shifters to the receive channels, so that the relative phase, i.e., the phase difference between the receiver RF signals 271 and LO path output signal 272, remains unchanged versus the calibrated result.

In various embodiments, when more than one transmit channel is enabled at a time, e.g., for Code-division MIMO or Frequency-division MIMO, then after the calibration sequence, control circuit 219 computes the optimum phase shift for each receive channel to accomplish the targeted goal, i.e., cancellation of DC offset or minimization of uncorrelated phase noise. Depending on the relative phase between the transmit signals, the optimum IF noise or DC offset may not be as low as the optimum IF noise or DC offset found with one single transmit channel enabled at a time, but the computation of the optimum phase in the LO signals to the receive channels still allows radar device 200 to reach the relative optimum value of DC offset or IF noise. When a different phase shift is generated in the transmit phase shifter of the enabled transmit channel compared to the transmit phase shift that was used during calibration, the corresponding transmit phase shift is taken into account in all the phase shifters to the receive channels so that the phase difference between receive RF and LO signals remains unchanged versus the calibrated result.

FIG. 3 is a flow diagram of a method 300 for performing leakage cancellation in an automotive radar system according to some embodiments. The method 300 may be implemented in some embodiments of transceivers and microcontrollers, such as the transceiver 205 and microcontroller 250 shown in FIG. 2.

In various embodiments, blocks 304 through 316 may be considered the calibration mode of transceiver 205. At block 304, DC voltages of an IF signal versus the relative phase from RF mixer 212 are measured by voltage sensor 270 and stored for analysis by control circuit 219 of digital controller 262. At block 308, control circuit 219 analyzes the measured DC voltages and selects the maximum and/or minimum DC voltage from the measured DC voltages. At block 312, control circuit 219 determines the corresponding relative phase associated with the maximum DC voltage. At block 316, control circuit 219 generates an LO phase shifting signal 275 for use by phase shifter 214 to adjust the phase of delayed frequency synthesizer signal 297.

In various embodiments, blocks 320 through 324, or blocks may be considered the operation mode or functional mode of transceiver 205. At block 320, control circuit 219 generates a transmit phase shifting signal 276 for use by phase shifter 216 to adjust the phase of frequency synthesizer signal 278. At block 324, the relative phase associated with LO port 288 and RF port 277 of RF mixer 212 is adjusted based on the relative phase that corresponds to the selected DC voltage. In various embodiments, the phase of frequency signal 277 (or delayed frequency signal 297) is adjusted by the amount specified by phase shifting signal 275.

At block 328, a transmit phase associated with transmit path 292 is adjusted based on the relative phase that corresponds to the selected DC voltage. In various embodiments, phase shifter 216 adjusts the phase of frequency signal 278 by the amount specified by phase shifting signal 276.

In various embodiments, a transceiver includes a transmitter, a frequency synthesizer coupled to the transmitter, a receiver coupled to the frequency synthesizer and a voltage sensor, and a digital controller coupled to the voltage sensor, the receiver, and the transmitter, wherein based on a DC voltage measurement of an IF signal made by the voltage sensor, a relative phase adjustment occurs of a relative phase associated with a local oscillator (LO) port and a radio frequency (RF) port of the receiver.

In various embodiments of the transceiver, the digital controller includes a control circuit configured to maintain the relative phase at a constant relative phase between the LO port and the RF port.

In various embodiments of the transceiver, the DC voltage measurement is a maximum DC IF voltage.

In various embodiments of the transceiver, the DC voltage measurement is a minimum DC IF voltage.

In various embodiments of the transceiver, the receiver includes an LO path coupled to the LO port, the LO path including an LO phase shifter for maintaining the constant relative phase.

In various embodiments of the transceiver, the relative phase adjustment occurs by adjusting an LO phase-shifter phase setting of the LO phase shifter.

In various embodiments of the transceiver, the transmitter includes a transmit path, the transmit path including a transmit phase shifter.

In various embodiments of the transceiver, the relative phase adjustment occurs by adjusting a transmit phase shifter phase setting of a transmit phase shifter.

In various embodiments of the transceiver, the LO phase-shifter phase setting is kept constant relative to the transmit phase shifter phase setting and the transmit phase shifter phase setting is kept constant relative to the LO phase-shifter phase setting. In various embodiments of the transceiver, based on the LO phase-shifter phase setting and transmit phase-shifter phase setting being kept constant relative to each other, the relative phase is maintained at the constant relative phase.

In various embodiments of the transceiver, the frequency synthesizer is kept at a first frequency.

In various embodiments, a method includes measuring a plurality of DC voltages of an IF signal from an RF mixer using a voltage sensor: selecting a DC voltage of the plurality of DC voltages;

recording a first relative phase associated with the DC voltage; and adjusting a relative phase at a local oscillator (LO) port and a receiver port of the RF mixer based on the first relative phase and the DC voltage.

In various embodiments of the method, the DC voltage is a maximum DC voltage of the plurality of DC voltages and the first relative phase corresponds to the maximum DC voltage.

In various embodiments, the method further includes generating an LO phase shifting signal based on the DC voltage and the first relative phase and using the LO phase shifting signal and a frequency synthesizer signal from a frequency synthesizer to generate an LO path output signal.

In various embodiments of the method, the DC voltage is a minimum DC voltage and the first relative phase corresponds to the minimum DC voltage.

In various embodiments, the method further includes generating a transmit phase shifting signal based on the DC voltage and the first relative phase; and using the transmit phase shifting signal and a frequency synthesizer signal from a frequency synthesizer to generate an LO path output signal.

In various embodiments, the method further includes sweeping an LO phase shifter and a transmit phase shifter simultaneously such that the relative phase at the LO port and the RF port is kept constant at the first relative phase associated with the DC voltage.

In various embodiments, a radar device includes a receiver having a local oscillator (LO) phase shifter in an LO path; a transmitter having a transmit phase shifter in a transmit path; a voltage sensor coupled to the receiver to measure a DC voltage of an intermediate frequency (IF) signal from the receiver; and a control circuit coupled to the voltage sensor, the receiver, and the transmitter, wherein, based on the DC voltage measured by the voltage sensor, the control circuit provides a phase adjustment signal to the LO phase shifter to adjust a relative phase of the receiver.

In various embodiments of the radar device, the DC voltage is a maximum DC IF voltage.

In various embodiments of the radar device, the DC voltage is a minimum DC IF voltage.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A transceiver, comprises:
a transmitter;
a frequency synthesizer coupled to the transmitter;
a receiver coupled to the frequency synthesizer and a voltage sensor; and
a digital controller coupled to the voltage sensor, the receiver, and the transmitter, wherein based on a direct current (DC) voltage measurement of an intermediate frequency (IF) signal made by the voltage sensor, a relative phase adjustment occurs of a relative phase associated with a local oscillator (LO) port and a radio frequency (RF) port of the receiver, wherein the DC voltage measurement occurs periodically relative to the phase of the LO port and the RF port.

2. The transceiver of claim 1, wherein:
the digital controller includes a control circuit configured to maintain the relative phase at a constant relative phase between the LO port and the RF port.

3. The transceiver of claim 2, wherein:
the DC voltage measurement is a maximum DC IF voltage.

4. The transceiver of claim 2, wherein:
the DC voltage measurement is a minimum DC IF voltage.

5. The transceiver of claim 2, wherein:
the receiver includes an LO path coupled to the LO port, the LO path including an LO phase shifter for maintaining the constant relative phase.

6. The transceiver of claim 5, wherein:
the relative phase adjustment occurs by adjusting an LO phase-shifter phase setting of the LO phase shifter.

7. The transceiver of claim 6, wherein:
the transmitter includes a transmit path, the transmit path including a transmit phase shifter.

8. The transceiver of claim 7, wherein:
the relative phase adjustment occurs by adjusting a transmit phase shifter phase setting of the transmit phase shifter.

9. The transceiver of claim 8, wherein:
the LO phase-shifter phase setting is kept constant relative to the transmit phase shifter phase setting and the transmit phase shifter phase setting is kept constant relative to the LO phase-shifter phase setting.

10. The transceiver of claim 9, wherein:
based on the LO phase-shifter phase setting and transmit phase-shifter phase setting being kept constant relative to each other, the relative phase is maintained at the constant relative phase.

11. The transceiver of claim 1, wherein:
the frequency synthesizer is kept at a first frequency.

12. A method, comprising:
measuring a plurality of direct current (DC) voltages of an intermediate frequency (IF) signal, from a radio frequency (RF) mixer using a voltage sensor, periodically relative to a phase of a local oscillator (LO) port and a receiver port of the RF mixer;
selecting a DC voltage of the plurality of DC voltages;
recording a first relative phase associated with the DC voltage; and
adjusting a relative phase at the LO port and the receiver port of the RF mixer based on the first relative phase and the DC voltage.

13. The method of claim 12, wherein:
the DC voltage is a maximum DC voltage of the plurality of DC voltages and the first relative phase corresponds to the maximum DC voltage.

14. The method of claim 12, wherein:
the DC voltage is a minimum DC voltage and the first relative phase corresponds to the minimum DC voltage.

15. The method of claim 12, further comprising:
generating an LO phase shifting signal based on the DC voltage and the first relative phase;
using the LO phase shifting signal and a frequency synthesizer signal from a frequency synthesizer to generate an LO path output signal.

16. The method of claim 12, further comprising maintaining the relative phase at a constant relative phase between the LO port and the receiver port by way of a digital controller.

17. The method of claim 12, further comprising adjusting an LO phase-shifter phase setting of the LO phase shifter to adjust the relative phase.

18. The method of claim 17, wherein adjusting the relative phase further comprises adjusting a transmit phase shifter phase setting of a transmitter.

19. The method of claim 18, further comprising keeping an LO phase-shifter phase setting constant relative to the transmit phase shifter phase setting and keeping the transmit phase shifter phase setting constant relative to the LO phase-shifter phase setting.

20. The method of claim 19, further comprising maintaining the relative phase at a constant relative phase based on the LO phase-shifter phase setting and transmit phase-shifter phase setting being kept constant relative to each other.

* * * * *